Dec. 19, 1967  D. D. BUSSARD ETAL  3,358,725
GUARD STRUCTURE FOR CANVAS BASKET RIMS
Filed June 29, 1966  2 Sheets-Sheet 1

David D. Bussard
Russell D. Bussard
INVENTORS

BY *Clarence A. O'Brien*
and *Harvey B. Jacobson*
Attorneys

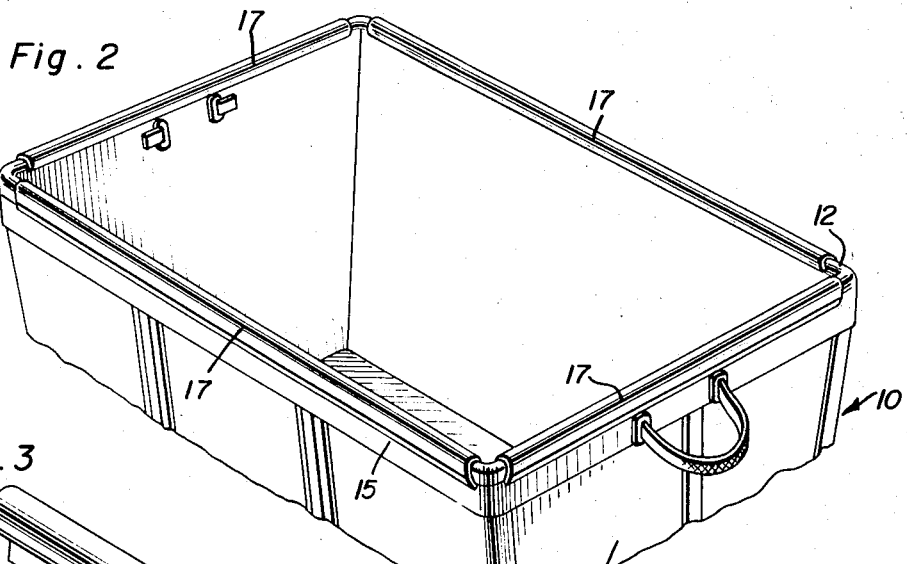
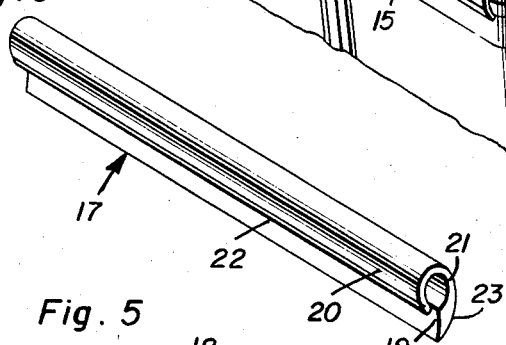
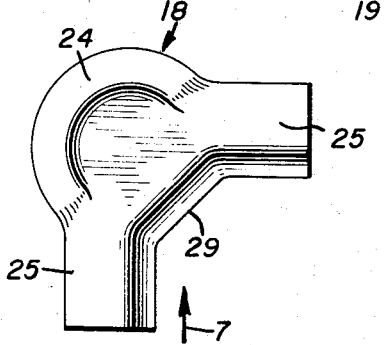
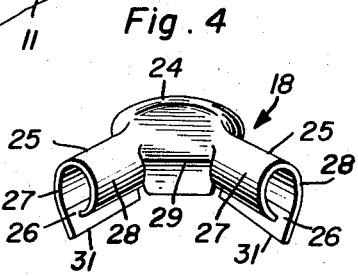
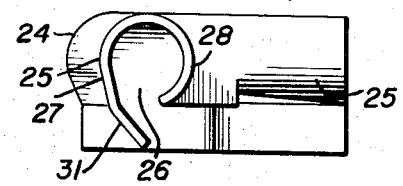
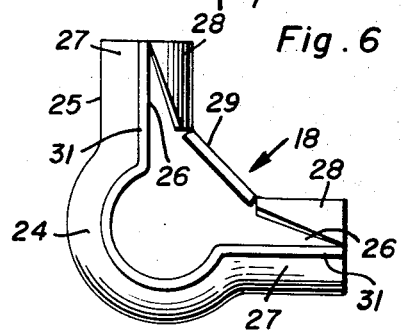
David D. Bussard
Russell D. Bussard
INVENTORS

United States Patent Office 3,358,725
Patented Dec. 19, 1967

3,358,725
GUARD STRUCTURE FOR CANVAS BASKET RIMS
David D. Bussard, Corvallis, Oreg., and Russell D. Bussard, Albany, Oreg. (both % P.O. Box 206, Albany, Oreg. 97321)
Filed June 29, 1966, Ser. No. 561,640
8 Claims. (Cl. 150—51)

ABSTRACT OF THE DISCLOSURE

A molded guard structure for canvas basket rims providing tubular sections which fit over and frictionally engage the straight portions of a basket rim. In addition, angular corner guards containing a slotted interior are installed over the straight guard portions to complete peripheral protection of the entire rim.

This invention relates to new and useful improvements in what may generally be referred to as canvas baskets having a body of canvas or like material supported by a metallic framework.

Baskets of this general type are commonly used in dry cleaning establishments, laundries, factories, department stores, post offices, hospitals and other industrial, commercial or institutional concerns for holding and transporting clothing, packages, and a wide variety of other articles. Generally referred to as baskets, they are also called hampers and sometimes carts or trucks, when they are wheel mounted. Also, while such baskets are usually made of ordinary canvas, plastic coated canvas, vinyl coated nylon, or other suitable materials is often employed in their construction.

In any event, such baskets usually have a top rim where the basket material is wrapped around a perimetric metal frame, and although the rim portion of the basket is usually protected by a covering of leather, or the like, it frequently becomes damaged by tearing, abrasion and ordinary wear after the basket has been in use for some time.

It is, therefore, the principal object of this invention to safeguard the rim of the basket from wear and mutilation, this object being attained by the provision of a protective guard structure which may be quickly and easily applied to the rim of a conventional basket to prevent wearing, tearing, cutting or other mutilation thereof during use.

The conventional basket rim is constituted by a plurality of substantially cylindrical side members which extend longitudinally between the corners of the basket, and the protective guard structure of the invention includes substantially tubular, slotted, guard rails which are adapted to enclose and be frictionally retained in position on the respective side members of the rim. In addition, the guard structure includes a plurality of corner pieces each having a pair of angularly disposed split tubular sockets to overlap and frictionally engage end portions of the guard rails on two adjacent rim side members. Thus, the guard structure of the invention protectively covers the entire rim of the basket and the basket rim is effectively safeguarded against damage.

An important feature of the invention resides in providing the guard rails as an extruded section in running length, which may be cut into pieces of proper length to suit baskets of different sizes, whereby it is not at all necessary to provide a special guard of a given size for a given size basket.

The guard structure of the invention may be quickly and easily installed and lends itself to convenient and economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a fragmentary perspective view of the basket with only the guard rails positioned on the side members of the rim, prior to application of the corner pieces;

FIGURE 3 is a perspective view of one of the guard rails per se;

FIGURE 4 is a perspective view of one of the corner pieces;

FIGURE 5 is an enlarged top plan view of the corner piece;

FIGURE 6 is a bottom plan view thereof;

FIGURE 7 is an elevational view, taken in the direction of the arrow 7 in FIGURE 5;

Figure 1:
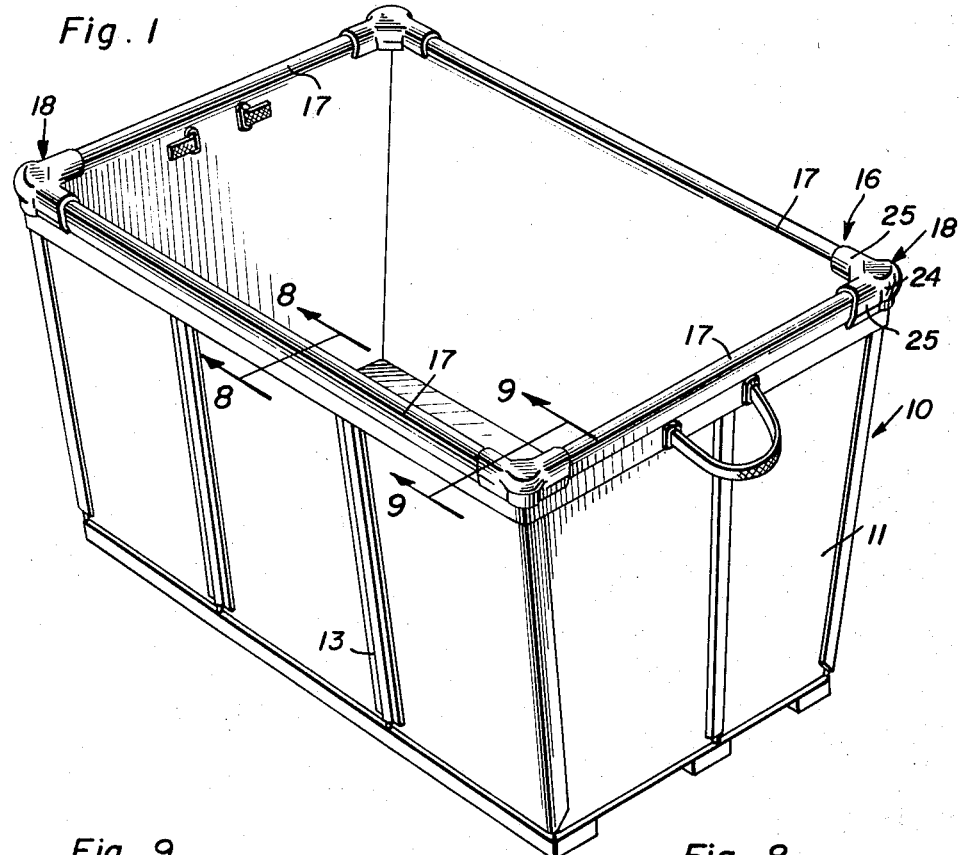
FIGURE 1 is a perspective view of a conventional canvas basket with the protective guard structure of the invention in situ on the rim thereof.

Referring now to the accompanying drawings in detail, the general reference numeral 10 designates a conventional canvas basket which, in the instance illustrated, is rectangular in form and has a canvas body 11 with a top rim 12. The body of the basket is supported by a metal framework which may be either exteriorly of the basket body as illustrated at 13, or contained within the side walls of the basket body, in accordance with conventional practice. In any event, at the top rim of the basket the framework includes cylindrical, perimetrically extending rod 14 and the canvas material of the basket body is wrapped around the rod as indicated at 11′ in FIGURES 8 and 9. It is also customary in conventional practice to provide a covering of leather or similar material 15 on the wrapped around portions 11′ of the canvas at the rim of the basket, so as to protectively enclose the canvas at this point.

However, when the basket is in use, the protective covering 15 as well as the underlying canvas 11′ are subjected to considerable wear and damage by tearing, friction, abrasion, cutting, or the like, so that replacement of the canvas body often becomes necessary.

The present invention provides a protective guard structure for the rim 12 of the basket, whereby damage of the leather covering 15 and of the canvas portion 11′ is averted.

The protective guard structure of the invention is designated generally by the reference numeral 16 and comprises a plurality of guard rails 17 and a plurality of corner pieces 18.

Each of the guard rails 17 has a substantially tubular form and is provided with the underside thereof with an open-ended slot 19, the rail thus having an inner side portion 20 and an outer side portion 21 at the opposite sides of the slot. The inner side portion 20 of the rail is formed integrally with a narrow lip or bead 22, while the outer side portion 21 is formed integrally with a substantially thickened longitudinal rib 23 which projects downwardly below the bead 22 of the inner side portion 20.

The guard rail 17 is preferably formed by extrusion from suitable plastic material having a certain amount of inherent resiliency and flexibility so that the side portions 20, 21 of the rail may be spread apart to widen the slot 19 and facilitate application of the guard rail to one of the side members of the basket rim 12. It will be understood, of course, that a separate guard rail 17 is applied to each side member of the basket rim and the cross-sectional dimension of the guard rail is such that when it is installed in position, the basket rim side member is protectively enclosed within the guard rail and the guard rail is frictionally retained in place.

As a practical matter, the guard rail material may be extruded in a running length and cut to pieces of an appropriate length to fit the sides of the basket rim, regardless of the size of the basket.

Figure 8:
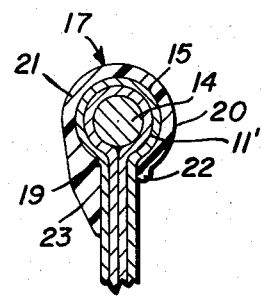
FIGURE 8 is a fragmentary sectional detail, taken substantially in the plane of the line 8—8 in FIGURE 1.

It will be also apparent from FIGURE 8 that when the guard rail is in position on the basket rim, the depending rib 23 engages and reinforces the outside of the basket wall below the rim. Also, the provision of the bead 22 at the inside of the guard rail prevents any possibility of the basket material being cut by the slotted inner edge of the rail.

The aforementioned corner pieces 18 are positioned at the corners of the basket rim to complete the protective guard structure. The corner pieces 18 are preferably molded from plastic material, each corner piece comprising a substantially semi-cylindrical center portion 24 which is hollow and has an open bottom, as will be apparent from FIGURE 6. The center portion 24 is formed integrally with a pair of substantially tubular sockets 25 which are open-ended and are disposed at an angle to each other. In the illustrated instance of a four-sided basket, the two sockets 25 of the corner piece are substantially at right angles, although it will be appreciated that if the basket should have three sides or more than four sides, the angular relationship of the sockets will vary accordingly.

Each of the sockets 25 is provided at the underside thereof with a slit or slot 26, the socket thus having an outer side portion 27 and an inner side portion 28 at the opposite sides of the slit. The inner side portions 28 of the two sockets of each corner piece are connected by a diagonal wall 29 of the center portion 24, as will be readily apparent. It will be also observed that the outer side portions 27 of the sockets 25 are formed integrally with downwardly projecting rails 31 which project below the inner side portions 28.

The material of the corner pieces 18 is also flexible and somewhat resilient so that the split sockets 25 may be spread apart to facilitate positioning of the corner pieces at the corners of the basket rim. In so doing, the sockets 25 of each corner piece are snapped over end portions of two adjacent guard rails 17 so that the end portions of the guard rails are disposed within and frictionally engaged by the sockets.

Figure 9:
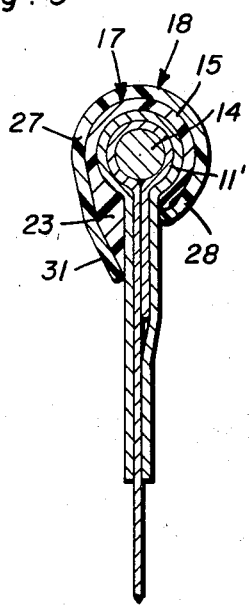
FIGURE 9 is a fragmentary sectional detail, taken substantially in the plane of the line 9—9 in FIGURE 1.

When the corner pieces 18 are installed, the depending rims 31 on the outer side portions 27 of the sockets 25 overlap the depending rims 23 of the guard rails 17 as shown in FIGURE 9, so that the guard rails are effectively reinforced by the corner pieces at the corners of the basket rim.

The entire rim guard structure is retained in position, of course, by the frictional engagement of the guard rails 17 with the side members of the rim, and by the frictional engageemnt of the corner piece sockets 25 with the end portions of the guard rails.

The material of the guard rails and of the corner pieces is sufficiently durable to safeguard the rim of the basket for considerable periods of time. However, if after continuous use, the protective guard structure should become damaged, it may be readily removed from the basket rim and replaced, without the necessity of replacing the canvas basket body itself.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The combination of a basket of canvas or like material having a top rim constituted by a plurality of substantially cylindrical side members extending longitudinally between basket corners, and a protective guard structure for said basket rim, said guard structure comprising a plurality of substantially tubular and longitudinally slotted guard rails enclosing and frictionally retained on the respective side members of the rim, and a plurality of corner pieces disposed at the respective basket corners, each corner piece including a pair of angularly disposed split tubular sockets overlapping and frictionally engaging end portions of said guard rails on two adjacent of said side members, said basket rim being four-sided, said sockets of each corner piece being disposed at right angles to each other, said guard rails and said corner pieces being formed from plastic material, each of said guard rails being slotted at the underside thereof and includes inner and outer side portions at the opposite sides of its slot, the outer side portion of the guard rail being formed integrally with a thickened rib projecting downwardly below the inner side portion of the rail.

2. The combination as defined in claim 1 wherein each tubular socket of said corner pieces is split at the underside thereof and includes inner and outer side portions at the opposite sides of its split, the outer side portion of the socket being formed integrally with a rib projecting downwardly below the inner side portion and overlapping the thickened rib of the associated guard rail.

3. The combination as defined in claim 1 together with a bead provided integrally at the lower edge of the inner side portion of said guard rail.

4. A protective guard structure for the top rim of a basket of canvas or like material, said guard structure comprising a plurality of substantially tubular and longitudinally slotted guard rails adapted to enclose and be frictionally retained on side members of a basket rim, and a plurality of corner pieces each including a pair of angularly disposed split tubular sockets overlapping and frictionally engaging end portions of two adjacent of said guard rails, each of said guard rails being slotted at the underside thereof and includes inner and outer side portions at the opposite sides of its slot, the outer side portion of the guard rail being formed integrally with a thickened rib projecting downwardly below the inner side portion of the rail.

5. The structure as defined in claim 4 wherein each tubular socket of said corner pieces is split at the underside thereof and includes inner and outer side portions at the opposite sides of its split, the outer side portion of the socket being formed integrally with a rib projecting downwardly below the inner side portion and overlapping the thickened rib of the associated guard rail.

6. The structure as defined in claim 4 together with a bead provided integrally at the lower edge of the inner side portion of said guard rail.

7. The combination of a basket of canvas or like material having a top rim constituted by a plurality of substantially cylindrical side members extending longitudinally between basket corners, and a protective guard structure for said basket rim, said guard structure comprising a plurality of substantially tubular and longitudinally slotted guard rails enclosing and frictionally retained on the respective side members of the rim, the inner side portion of said guard rails being further characterized by a bead provided integrally at the lower edge thereof, and a plurality of corner pieces disposed at the respective basket corners, each corner piece including a pair of angularly disposed split tubular sockets overlapping and frictionally engaging end portions of said guard rails on two adjacent of said side members, said sockets of each corner piece being disposed at right angles to each other and wherein said guard rails and said corner pieces are formed from plastic material.

8. A protective guard structure for the top rim of a basket of canvas or like material, said guard structure comprising a plurality of substantially tubular and longitudinally slotted guard rails adapted to enclose and be frictionally retained on side members of a basket rim, the inner side portion of said guard rails being further characterized by a bead provided integrally at the lower edge thereof, and a plurality of corner pieces each including a pair of angularly disposed split tubular sockets overlapping and frictionally engaging end portions of two adjacent of said guard rails.

References Cited

UNITED STATES PATENTS

| 2,615,593 | 10/1952 | Wolforth | 220—73 |
| 3,233,644 | 2/1966 | Bono | 150—51 |

WILLIAM T. DIXSON, Jr., *Primary Examiner.*

FRANKLIN T. GARRETT, *Examiner.*